(No Model.) 2 Sheets—Sheet 1.
E. TRUSLOW.
FENCE.
No. 409,078. Patented Aug. 13, 1889.
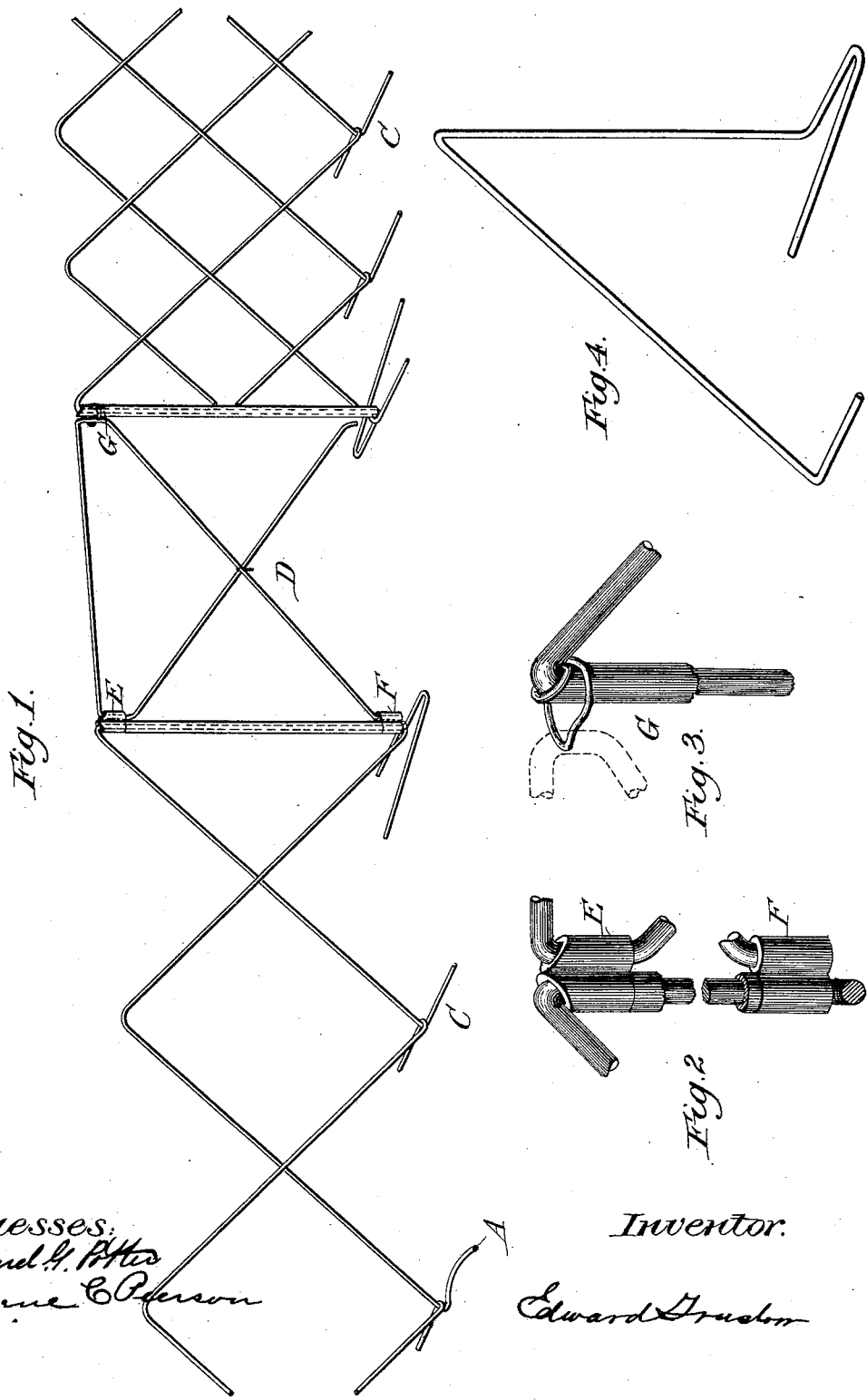

(No Model.) 2 Sheets—Sheet 2.

E. TRUSLOW.
FENCE.

No. 409,078. Patented Aug. 13, 1889.

Witnesses
Inventor.

UNITED STATES PATENT OFFICE.

EDWARD TRUSLOW, OF SUMMIT, NEW JERSEY.

FENCE.

SPECIFICATION forming part of Letters Patent No. 409,078, dated August 13, 1889.

Application filed October 20, 1887. Serial No. 252,942. (No model.)

*To all whom it may concern:*

Be it known that I, EDWARD TRUSLOW, a citizen of the United States, residing at Summit, in the county of Union and State of New Jersey, have invented a new and useful Fence, of which the following is a specification.

My invention relates to a form and method of construction and adjustment of fence applicable to lawn, farm, and other use, of great strength, durability, and efficiency, which is portable, artistic, and cheap, may be constructed of material so light, yet strong, as to be almost invisible at a short distance, requires no digging for post-holes—thus saving large expense in labor of setting—and is safe from upheaval and displacement by the disturbing action of frost, which frequently injures fences with posts set into the ground.

Figure 5:
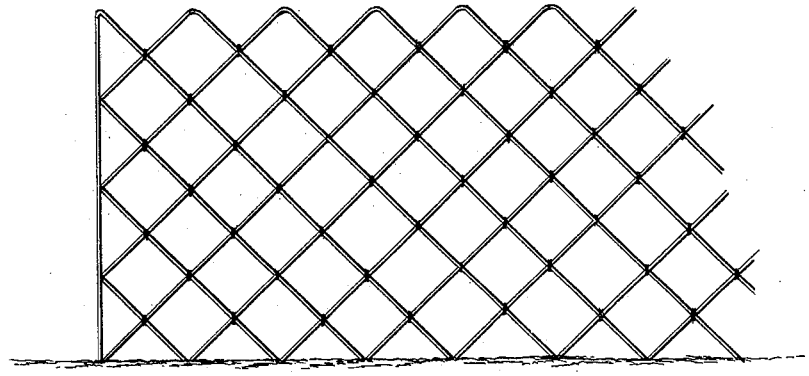

In the annexed drawings, Figure 1 is a side elevation of my improved fence. Fig. 2 is an enlarged detail view of the upper and lower gate-hinges. Fig. 3 is a view showing the gate-fastener. Fig. 4 is a view of one of the gate-stanchions. Fig. 5 is an elevation of a fence having wire rods with the feet embedded in the earth, and Figs. 6 and 7 show modifications in the construction of the fence.

Figure 6:
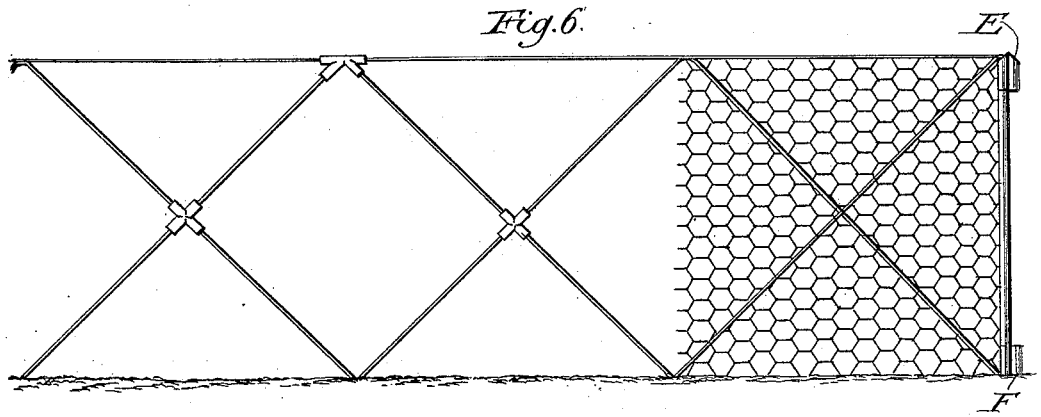
Figure 7:
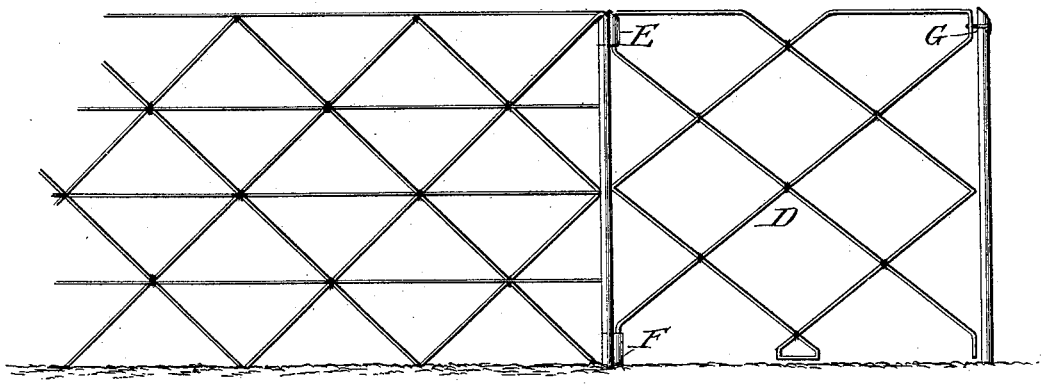

This fence, constructed of galvanized-iron rods or other bars, is set upon the surface of the ground after clearing and leveling the place for the feet to rest, as shown in annexed drawings, Fig. 1, when the feet may be slightly covered and hidden and the earth evened over them, as shown in Figs. 5, 6, and 7, thus increasing the firmness of setting and neatness of appearance.

The action of this fence under the expansion and contraction of the earth caused by freezing and thawing is merely to slightly rise and fall with the ground movement without the displacement which frequently occurs with ordinary post-fences. It will be observed that the narrowness of the projecting feet will not permit any very disturbing pressure of the earth at any place, and the tendency of any ordinary movement of the ground would be to increase the firmness of the embedding of the feet.

The fence is constructed of rods bent and interlocked, as shown in Fig. 1. The places at which the feet interlock may be firmly bound and held together with two or more turns and twists of pliable galvanized-wire or other tie, and a similar binding or tie may be made at each crossing or connection of bar higher up on the fence. It may be observed that this form of construction not only gives great strength lengthwise of fence for resisting the strain of tightly-stretched wire cables or lines, but also by the system of interlocking and tying of rods, cables, wire, or other bars, and the projecting feet, gives great strength laterally to resist side pressure without the aid of posts set into the ground. The feet are most effective when placed at or near right angles from the fence, but may project at any angle or from one or both sides of the fence to suit the ground and yet be sufficiently rigid if the fence is firmly placed at the ends.

Another feature of my invention is the novel form of gate, hinges, and catch demanded by and devised especially for use with this peculiar form of fence, the ordinary forms in use being inapplicable to it, and the simple, easy, and substantial method of hanging and adjusting the gate to open to either side and shut by its own weight by slipping down the slanting face of the top hinge E, Fig. 2. Before completing the shaping of the vertical stanchion from which the gate is to hang (see Figs. 2 and 4) a hinge, formed by firmly uniting by casting or otherwise two hollow cylindrical pieces of galvanized iron or other material, both of which are slanted at top in elliptical form, is slid upon the bar to inclose it, with the elliptical ends uppermost, one slant being formed to lock against the shaped bar of fence while the other slant is to hang the gate upon to cause it to shut by the gate's weight, as shown at E, Fig. 2. Next to the upper hinge, and under it, is slid upon the bar, to inclose it, a piece of galvanized-iron or other pipe to support the upper hinge, to stiffen the stanchion to resist extra strain of stretching cables or wire fastened upon it and for symmetry of appearance. (See Figs. 1, 6, and 7.) A similar pipe is slipped over the bar of the vertical stanchion opposite the stanchion upon which the gate hangs, or upon and over an end stanchion, for the same stiffening purpose and to harmonize appearance, as shown in Figs. 1 and 7. Next to the pipe, and under it, is slid upon the bar, to inclose it, the lower hinge, which is formed by firmly uniting, by casting or otherwise, two hollow cylindrical pieces, as shown at Fig. 2, when the bar of the fence may be bent to its proper permanent form, as shown.

In the construction of the gate the bar is shaped, as shown at D, Fig. 1; but before the shaping is completed a part of the bar is inserted in the upper hinge, as shown at E, Fig. 2, and another part in the lower hinge at F, when the gate may be shaped and permanently fixed to its proper form and the crossings and connections, where required, bound and joined with wire or other tie.

The spring-catch to hold the gate when closed is formed of spring-wire or other material by shaping or forming a small loop or opening to clasp the fence firmly near or at the top of stanchion and joining with the small loop another larger loop or opening having, with a slot, indentation, or curve opposite the small fixed loop to catch the gate, as shown at G, Fig. 3. The small loop or opening is firmly fixed at the top of stanchion of fence opposite the hinged stanchion that holds the gate, while the larger loop or opening loosely incloses the stanchion and projects and droops toward the gate, that meets the spring from either side and forces it downward to be sprung upward when the gate reaches the indentation or curve for a catch to hold the gate in position.

To open the gate, the spring is pressed downward with the hand to release the gate from the catch. The spring-catch may be fixed either upon the fence or gate.

The fence may be constructed in panels or sections of a single run of bars each, as shown in Fig. 6; or bars may be multiplied to form open lattice, as shown in Fig. 1, or close lattice to form complete fence without addition of other fencing material, as shown in Fig. 5. The gate also may be constructed to form open or close lattice.

All these inventions of gate, hinges, and catch were demanded by the novel and peculiar form of fence, and all mutually depend on each other and are necessary to the construction and completion of the entire fence.

Prior to my invention lattice-fences and gates and fences braced to stand upon wooden cross-pieces to rest upon the surface of the ground in lieu of posts set into the ground have been constructed, and I do not claim such device, broadly; but What I do claim as my invention, and desire to secure by Letters Patent, is—

1. The herein-described improved fence, consisting of interlocked rods or bars having laterally-projecting feet resting upon or embedded in the ground, whereby the fence is sustained in position, substantially as described.

2. The combination, with the interlocked rods or bars comprising the fence, of the vertical stanchions for the gate, the upper gate-hinge E, consisting of hollow metal cylinders having inclined upper edges, the lower gate-hinge F, consisting of hollow metal cylinders, and the gate-frame D, consisting of a bent rod or bar, arranged substantially as described.

3. The combination, with the two vertical stanchions, the gate located between them and consisting of the bent rod or bar D, and the hinges on one of the stanchions for said gate, said hinges consisting of metal cylinders constructed and joined together substantially in the manner and for the purpose described.

4. The combination, with the interlocked rods or bars having projecting feet resting upon or embedded in the ground, the vertical stanchions for the gate, the upper gate-hinge E, consisting of hollow metal cylinders, the lower gate-hinge F, the gate-frame D, consisting of a bent rod or bar, and a clasp for fastening the gate in a closed position, all the parts being arranged substantially in the manner described.

EDWARD TRUSLOW.

Witnesses:
EDWARD G. POTTER,
EUGENE C. PIERSON.